Dec. 14, 1965 R. W. KALNS ETAL 3,223,913
BATTERY CHARGER AND VOLTAGE CONTROL MEANS
Filed March 15, 1962
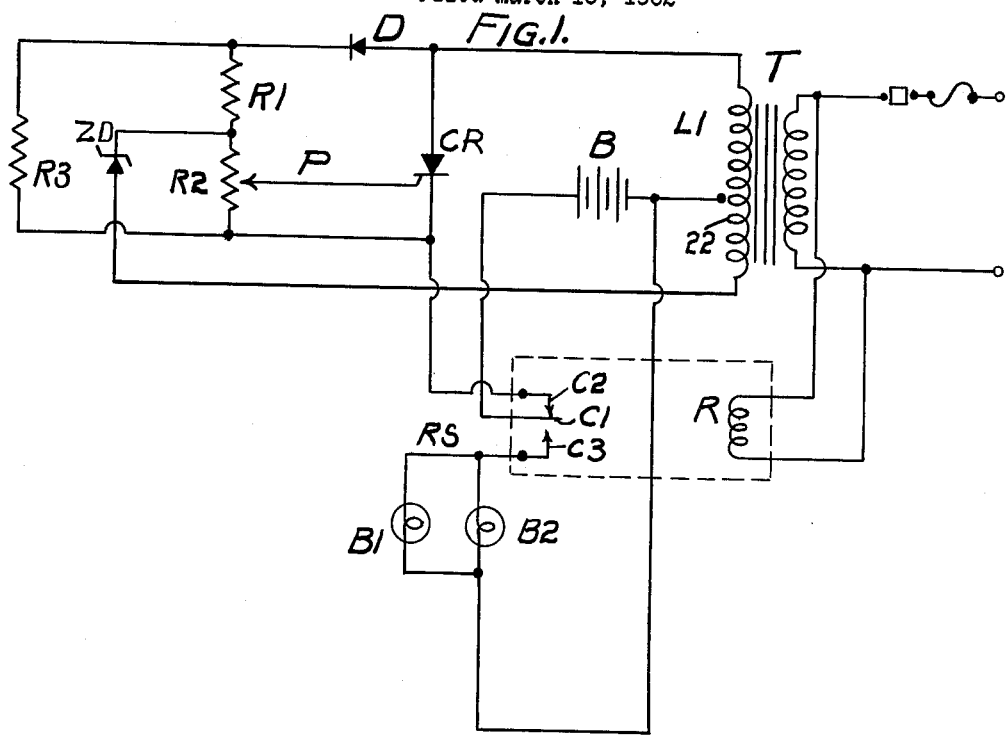
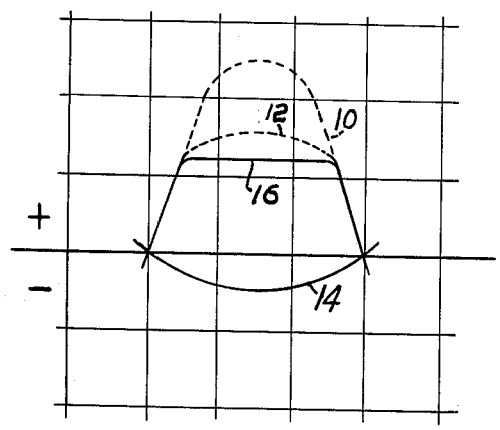
INVENTORS:
ALFRED W. VASEL,
RUDOLPH W. KALNS,
BY Robert E Ross ATT'Y.

United States Patent Office 3,223,913
Patented Dec. 14, 1965

3,223,913
BATTERY CHARGER AND VOLTAGE
CONTROL MEANS
Rudolph W. Kalns, Weymouth, Mass. (21 Mason St., South Weymouth, Mass.), and Alfred W. Vasel, 222 Linwood St., Abington, Mass.
Filed Mar. 15, 1962, Ser. No. 179,875
3 Claims. (Cl. 320—39)

This invention relates generally to battery charges, and has particular reference to a battery charger of the type having means for automatically controlling the charging current in accordance with the charge level of the battery.

Many types of emergency electrical devices are powered by batteries, which must be maintained in the fully charged stand-by condition for long periods of time. One device of this type is emergency lightening apparatus, used in public buildings to provide sufficient illumination to permit occupants to escape from the building in case of a power failure. The charging current for such apparatus is obtained from the 117 v. A.C. power line in the building, and the apparatus must be capable of remaining in the stand-by condition for years with a minimum of maintenance.

Although the batteries of such devices must be maintained in the fully charged condition, and it is also essential that they should not be overcharged, which causes electrolysis of the battery electrolyte, resulting in a reduced power capacity.

To maintain such batteries in the fully charged condition by automatic means energized from the building power line, it is customary to provide means for energizing and de-energizing charging circuit to the battery in accordance with the charge condition of the battery. Since the voltage of the battery is a function of its charge condition, this voltage is used to regulate the charging current, by comparing it with a standard reference voltage, and utilizing the difference to control the current flow through a suitable rectifying device.

A reference voltage may conveniently be obtained from the power line. However, such an arrangement operates satisfactorily only if the power line voltage is constant, since even minor variations in power line voltage affect the resulting bias voltage applied to the control device and hence affect the charge cut-off point.

Various arrangements have been used to compensate for line voltage variations, however, the additional current complexity involved reduces the reliability of the system and increases the cost.

The object of this invention is to provide a battery charger having simple and economical means for controlling the charge cut-off point which is not affected by normal variations in line voltage.

A further object of the invention is to provide a battery charger of the type described capable of utilizing a relatively inexpensive voltage regulator component, with means for compensating for imperfections in performance of said component.

Other objects of the invention will be apparent to one skilled in the art from the following detailed description of a specific embodiment thereof.

In accordance with the present invention, a battery charger is provided which is adapted to be operated from a suitable transformer energized by an alternating current power source, and has a high current charging path through a controlled rectifier and a low current or trickle charge path through a diode. A reference voltage of a desired amount is obtained from the transformer through a circuit including a fixed resistor and a variable resistor, and the reference voltage is applied as a bias to the control electrode of the controlled rectifier. The reference voltage is limited by means of a zener diode. To compensate for inperfections in the voltage controlling action of the zener, a bucking voltage out of phase with the reference voltage is applied to the zener diode in a manner to appear hereinafter.

In the drawing:

FIG. 1 is a schematic circuit arrangement of one embodiment of the invention;

FIG. 2 is a graph of the bias voltage wave form, illustrating the action of the zener diode in limiting the bias voltage, and the action of the bucking voltage in correcting variations in the voltage regulating action of the zener diode.

Referring to the drawing, the invention is illustrated herein as being applied to a battery powered emergency lighting device with a self-contained automatic charging unit powered from 115 v. A.C.

A transformer T is provided with a secondary coil having a charging and bias supply portion L1 and a bias correcting portion 22. The portion L1 of the secondary coil is connected to the battery through controlled rectifier CR and relay switch RS of relay R which has a common contact C1 adapted to complete a circuit between either contact C2 or C3. The coil of relay R is connected to the power line supply of the transformer. When relay R is energized, contact C1 is connected to contact C2, completing a charging circuit through the controlled rectifier. When relay R is not energized, contact C2 is connected to contact C3, completing a circuit from the battery through lights B1 and B2.

To provide means for controlling the charging circuit in accordance with the charge condition of the battery means is provided for applying a bias voltage to the control electrode of the rectifier, so that the effective bias between the control electrode and the cathode of the controlled rectifier will vary with the charge condition of the battery, with the bias having a predetermined value such as to actuate the controlled rectifier when the battery charge level, and consequently the battery voltage, is below a certain predetermined level, and to de-actuate the rectifier when the battery voltage has reached its maximum value when the battery is in its fully charged condition.

The effective bias is therefore the result of two values, one being a fixed bias voltage obtained from the transformer, the other being the voltage level above ground of the cathode of the controlled rectifier, which voltage level is determined by the battery voltage, so that variations in battery voltage cause corresponding variations in effective bias. The fixed bias voltage is obtained by providing, in parallel with the charging path, a diode D, a fixed resistor R1 and a variable resistor R2 with a tap P thereof connected to the control electrode of the controlled rectifier CR.

The upper limit of the voltage appearing in the bias circuit at the junction of resistors R1 and R2 may be established by providing a zener diode ZD which is connected between said junction and the outer end of the bias correcting portion 22 of the transformer.

As is well known in the art, a zener diode has a threshold voltage, above which the voltage drop across the diode is nearly independent of current flow. The action of the zener diode in controlling the bias voltage in the above described system is illustrated in FIG. 2. As shown therein, the wave form of the supply voltage, on an arbitrary scale, is shown at 10. A zener diode connected from the junction of the resistors to ground would limit the maximum voltage so as to provide a wave form as shown at 12. Since the so-called zener knee is not sharp, particularly with inexpensive zener diodes, a small rise in voltage from the threshold voltage occurs during the half-cycle. Hence, without the action of correcting voltage, as will be described hereinafter, the bias voltage would rise slightly from the established value during the charging cycle. It is evident that if the amount of the rise is known, it could be compensated for by the variable resistor R2, provided the amount of the rise were constant. However, although variations in line voltage do not affect the threshold voltage, they do affect the amount of the rise above the threshold voltage, hence if line voltage increases above an arbitrary normal value, the upper limit of the bias voltage also slightly increases and if line voltage falls below normal, the bias voltage decreases. Only a small increase in line voltage is sufficient to increase the bias voltage to a point where the battery voltage, even at full charge, is not sufficient to decrease the effective bias on the rectifier to a point where the charging current is shut off. Hence during periods when the line voltage is above normal, overcharging of the battery would occur.

During extended periods of below normal line voltage, the amount of the voltage rise above the zener threshold would be less than that when the voltage is normal, hence the bias voltage would be less, and the charging current of the battery would be shut off at a lower charge level than is desirable.

To compensate for such variations in line voltage and to prevent them from affecting the charge cut-off point, the zener diode in the herein illustrated embodiment of the invention is connected between the junction of resistors R1 and R2 and the outer end of the bias correcting coil, so that on the charging cycle a small voltage of opposite phase is applied to the zener diode, said voltage having a wave form as illustrated at 14 in FIG. 2, so that the resulting bias voltage has a wave form as shown at 16. The combining of the small out of phase voltage from the bias correcting portion of the transformer secondary with the main bias voltage not only tends to flatten the resulting wave form of the bias voltage, but is also self correcting for line voltage variations, since increases in line voltage, which would tend to increase slightly the amount of rise in zener voltage above the threshold voltage, also increase slightly the out of phase bucking voltage which substantially completely cancels out the zener voltage rise tendency.

In a particular embodiment of the invention, the battery B may be a 3 cell lead-acid type having a full charge voltage of 6.4, the transformer T may have a secondary coil L1 providing a charging voltage of 8.5 volts and a secondary coil 22 providing a zener diode bucking voltage of about .8 to 1 volt, with the other components having the following specifications:

R1 _____ 150 ohms.
R2 _____ 500 ohms.
R3 _____ 22 ohms.
D _____ RCA type 1N2858 diode.
ZD _____ Hoffman type 1N1313 zener diode.
CR _____ G.E. type C11-V controlled rectifier.

The operation of the circuit of FIG. 1 may be summarized as follows: Assuming that the battery B is at full charge when the device is placed in operation, the cathode of the controlled rectifier is 6.4 volts above ground. With the variable resistor tap P properly adjusted to provide a voltage of just under about 6.7 volts at the tap, the effective bias voltage is just under .3 volts, which is just under the firing voltage of the controlled rectifier, so that no current flows in the charging circuit. In the case of a power line failure, the relay R is de-energized to complete a circuit between contacts C1 and C3, energizing the emergency lights B1 and B2. Assuming that the power failure is of sufficient duration to cause appreciable discharging of the battery, when the power again comes on, the battery voltage will be less than the full charge voltage, for example, 6.3 volts. Hence the effective bias will be .4 volts, which is sufficient to fire the controlled rectified to permit charging current to flow in the charging circuit. When the charge level of the battery again results in a battery voltage of 6.4, the effective bias is again reduced to just under .3 volts, and the charging circuit is de-energized.

A trickle charge circuit is provided through the diode D and resistor R3 to compensate for internal losses in the battery occurring when the main charging circuit is not actuated.

During long stand-by periods, if the line voltage should rise, the bias voltage would tend to rise slightly, due to the action of the zener diode previously described. However, the line voltage rise also causes a slight rise in the bucking voltage provided by the portion L2 of the secondary coil, thereby preventing any change in bias voltage.

Although in the above described embodiment of the invention, a controlled rectifier is used to control the charging current, other means may be used, such as vacuum or gas-filled tubes, or a relay. It is also apparent that the method of voltage control disclosed herein may be used in apparatus other than battery chargers.

Since certain other changes within the scope of the invention may be made in the herein disclosed apparatus, it is intended that all matter contained herein be interpreted as illustrative and not a limiting sense.

We claim:

1. A battery charger, comprising a transformer having first and second secondary windings adapted to provide voltages out of phase with each other, and having a common junction, a charging circuit in series with said first winding and including a controlled rectifier having a control electrode, a bias circuit in parallel with said charging circuit and having means for providing a bias to said control electrode, and a zener diode connected between said control circuit and said secondary winding, whereby a voltage is applied to said zener diode during said charging cycle which is of opposite polarity to the bias voltage.

2. A battery charger adapted to be energized from an alternating current source, comprising a charging circuit and a control circuit, said charging circuit having a controlled rectifier adapted to impart a charging impulse to the battery during the charging portion of the source cycle when a suitable bias voltage is applied to a control element of said rectifier, said control circuit having means for applying said bias voltage to said control element, said means including a variable resistor and a zener diode associated therewith to limit said bias voltage, and means for applying a correcting voltage to said zener diode during said charging portion of the cycle which is of opposite polarity to the bias voltage.

3. A battery charger adapted to be energized from an alternating current source, comprising a transformer having first and second secondary windings, a charging circuit including a controlled rectifier and a battery in series with said first secondary winding, said controlled rectifier having a control electrode, a bias circuit in parallel with said controlled rectifier through a diode, a fixed resistor and a variable resistor having a tap connected to said control electrode, said diode being poled to apply a bias voltage to said control electrode during the charging portions of the source cycle, and a zener diode connected between the portion of the fixed resistor and the variable resistor and the second secondary winding, said zener diode being poled to limit the bias voltage, said second secondary winding providing a bias bucking voltage to the zener diode during the charging cycle which is at least equal to the difference between the threshold zener voltage and the maximum zener voltage which would be reached during the charging cycle in the absence of the bucking voltage.

References Cited by the Examiner
UNITED STATES PATENTS

| | | | |
|---|---|---|---|
| 2,999,173 | 9/1961 | Ruck | 307—88.5 |
| 3,012,153 | 12/1961 | Mussard | 328—175 X |
| 3,087,109 | 4/1963 | Bowers | 307—88.5 |

LLOYD McCOLLUM, *Primary Examiner.*